INVENTOR.
Robert R. Grover

INVENTOR.
Robert R. Grover

Aug. 2, 1960  R. R. GROVER  2,947,394
ELECTRIC CLUTCH AND BRAKE
Filed June 3, 1957  4 Sheets-Sheet 4

INVENTOR.
Robert R. Grover

United States Patent Office 2,947,394
Patented Aug. 2, 1960

2,947,394

ELECTRIC CLUTCH AND BRAKE

Robert R. Grover, Swanzey, N.H.
(R.F.D. 1, Winchester, N.H.)

Filed June 3, 1957, Ser. No. 663,241

3 Claims. (Cl. 192—18)

This invention relates to an electric clutch and brake and consists in the combination and arrangement of parts herein described and claimed.

The object of this invention is to produce a unitized form of electric clutch and brake assembly, with means of automatically disengaging a brake and engaging a clutch, and at any specified time as the stationary field is de-energized to have the clutch automatically disengage and have the brake applied.

Another object of this invention is to provide an electric clutch and brake unit with components interrelated in such a manner that a single source of actuation will provide a combination clutch and brake assembly with all forces self contained within its unitized form of assembly.

A further object of this invention is to provide a self contained unitized form of an electric clutch and brake assembly that can be assembled and adjusted as a unit prior to installation in a machine of which it will become a part thereof.

A still further object of this invention is to have all of the axial forces due to cam reaction, self contained within the electric clutch and brake assembly.

The principle of operation of this invention for an electric clutch and brake is one of servo-action. The electromagnetic means is a stationary field type of electro-magnet whose armature disc, along with the outer set of clutch plates, is driven by means of a drive cup, and whose actuator is driven with the inner set of plates that are in engagement with the thrust body. At the instant that the stationary field is energized the torque reaction between the actuator cam and armature is transferred into an axial movement by means of a ball and cam arrangement. This axial movement acts first to force the inner and outer plates of the multiple disc pack clutch together and at this instant resultant frictional slipping of the multiple disc pack clutch causes axial movement of the brake control sleeve to fully relieve pressure on the compression spring of the brake disc pack and further axial movement will apply sufficient pressure on the clutch disc pack to frictionally drive the inner and outer plates together in full couple. De-energization of the stationary field releases magnetic attraction between armature disc and stationary field. Return springs assisted by the compression spring of the multiple disc pack brake impose thrust on the disc cam causing actuator cam to return to its neutral position, releasing pressure on the multiple disc pack and allowing compression spring to apply sufficient pressure on inner and outer discs of the multiple disc pack brake to frictionally stop rotation of the driven members of the electric clutch and brake unit.

The cam mechanism of this invention is double acting, such that the electric clutch and brake is enabled to operate in either a clockwise or counter-clockwise direction of rotation and therefore may be used for reversing service.

Other objects of this invention will become apparent from a reading of the following specifications taken in conjunction with the drawings in which like symbols designate corresponding parts throughout:

Figure 2:
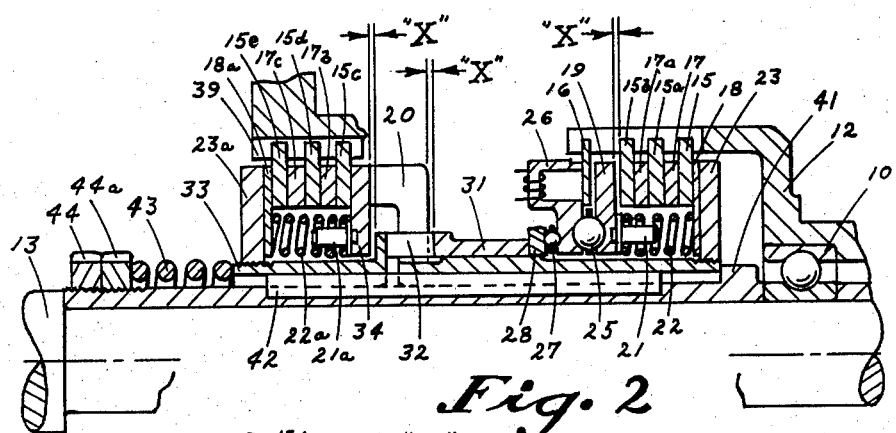
Figures 2-3 and 4 are sectional views of the embodiment of the invention showing a schematic cycle of electric clutch and brake action in which "X" denotes working clearance for adjacent members at specified positions throughout a cycle of operation of the electric clutch and brake unit as follows.

Figure 2 of schematic clutch and brake action: De-energization of stationary field with actuator cam in neutral position and brake fully applied.

Figure 3:
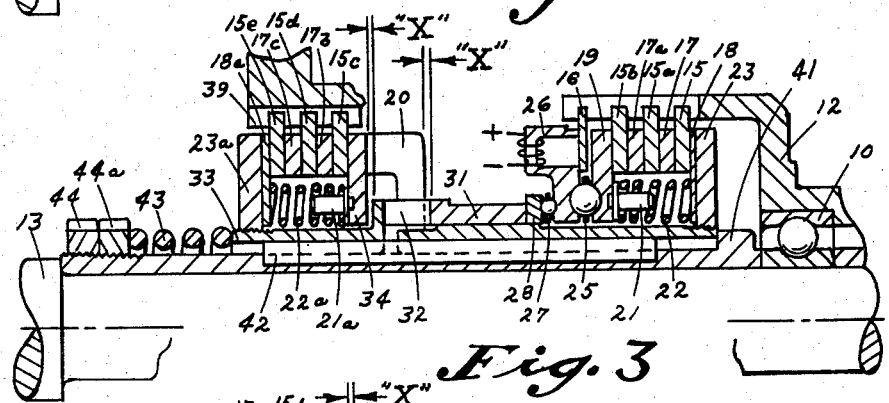

Figure 3 of schematic clutch and brake action: Energization of stationary field causing actuator cam to move in same direction as driving cup with resultant relative motion between actuator cam and disc cam causes axial movement of associated members to force inner and outer plates of multiple disc pack clutch together.

Figure 4:
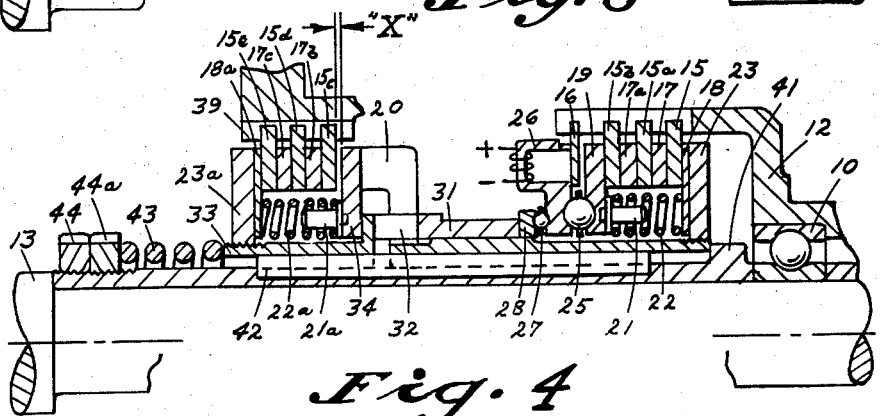

Figure 4 of schematic clutch and brake action: Energization of stationary field causes actuator cam to move in same direction as driving cup with resultant relative movement between actuator cam and disc cam causing axial movement of associated members to force inner and outer plates of multiple disc pack clutch together. Frictional slippage of the multiple disc pack clutch causes axial movement of the brake control sleeve to fully relieve pressure on the compression spring of the multiple disc pack brake and further axial movement has applied sufficient pressure on the multiple disc pack clutch to frictionally drive the inner and outer plates together in full couple.

Figure 5:
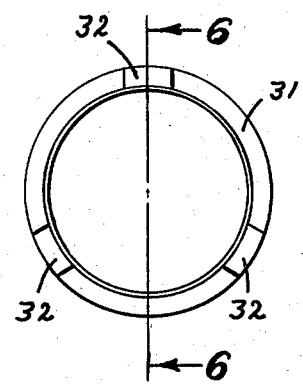

Figure 5 is an elevational view of the brake control sleeve forming a part of this invention.

Figure 6:
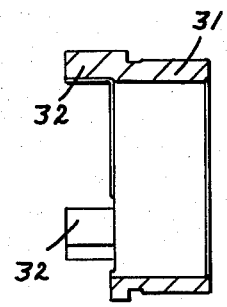

Figure 6 is a sectional view taken along line 6—6 of Figure 5.

Figure 7:
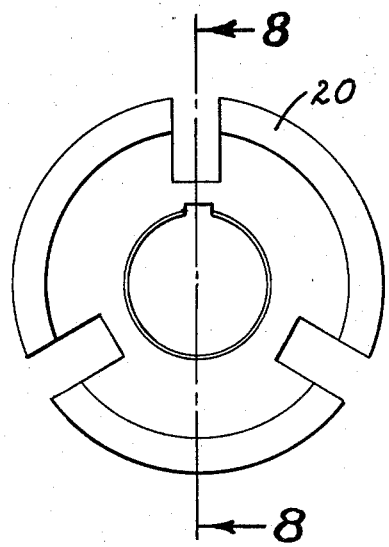

Figure 7 is an elevational view of the clutch body forming a part of this invention.

Figure 8:
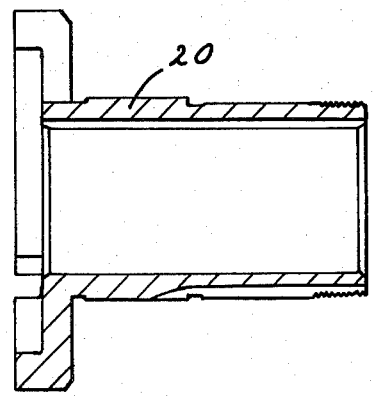

Figure 8 is a sectional view taken along line 8—8 of Figure 7.

Figures 9, 10, 11, 12:
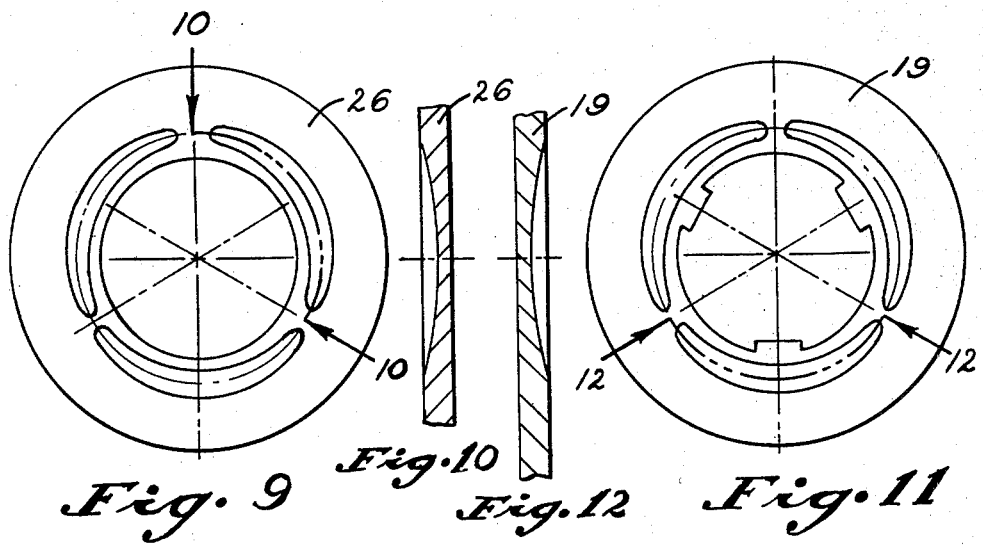

Figure 9 is an elevational view of the actuator cam forming a part of this invention.

Figure 10 is a sectional view taken along line 10—10 of Figure 9.

Figure 11 is an elevational view of the disc cam forming a part of this invention.

Figure 12 is a sectional view taken along line 12—12 of Figure 11 showing configuration of one of the cam surfaces of the disc cam.

Figures 13, 14:
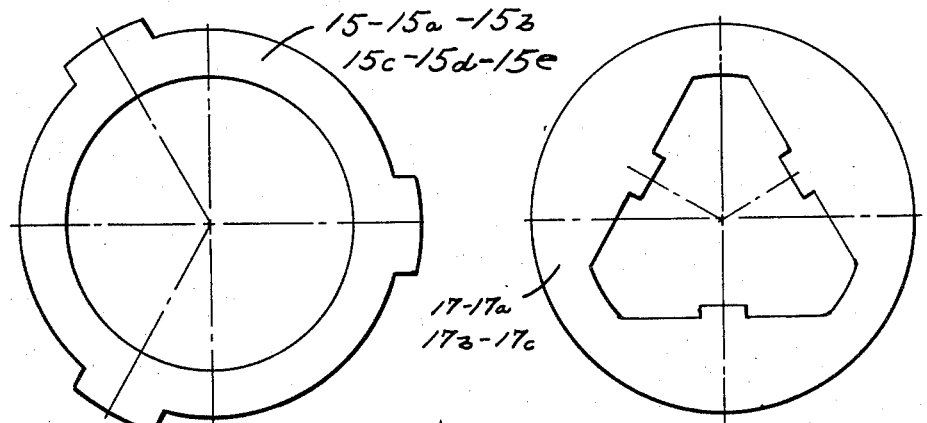

Figure 13 is an elevational view of an outer disc forming a part of this invention.

Figure 14 is an elevational view of an inner disc forming a part of this invention.

Figure 15:
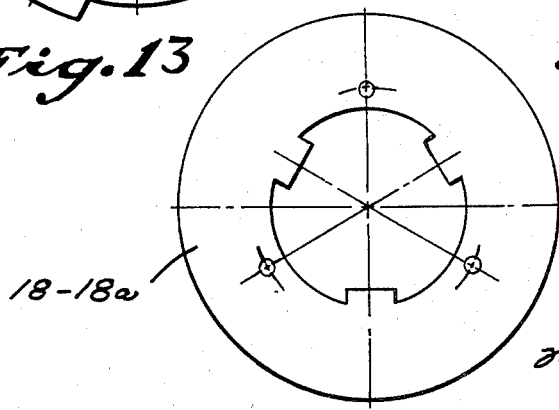

Figure 15 is an elevational view of an end plate forming a part of this invention.

Figure 1:
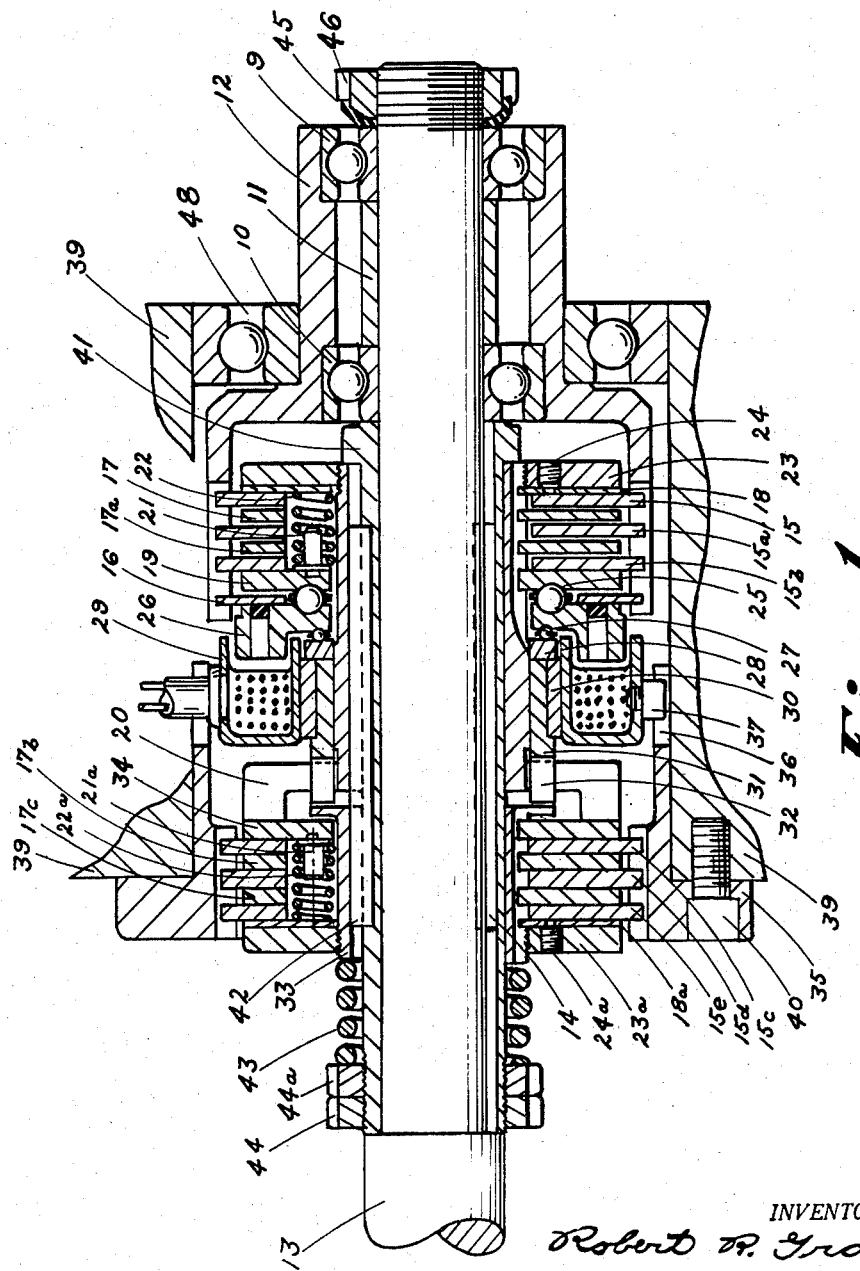
Figure 1 is a vertical sectional view of the embodiment of the invention.

Referring more particularly to the drawings, Figure 1 is a sectional view of the embodiment of the invention in which anti-friction bearings 9 and 10 and spacer 11 position driving cup 12 on driven shaft 13. Driven shaft 13 has a key and key-way 14 to align its associated members. Driving cup 12 is in positive engagement with lugs on outer discs 15—15a and 15b and armature disc 16. Inner disc 17 and 17a, lock plate 18 and disc cam 19 have inner driving lugs in engagement with clutch body 20. Disc cam 19 has three equally spaced positioning pins 21. These positioning pins are held in position by return springs 22, that in turn impose a thrust on lock plate 18. Lock plate 18 is backed up by end plate 23. End plate 23 is in threaded engagement with clutch body 20 and at assembly is locked in position by two or more lock screws 24. Each lock screw 24 has a projecting end to interengage holes in lock plate 18. Preferably three balls 25 are used in the cam mechanism that is comprised of actuator 26, disc cam 19 and ball type thrust bearing 27, and thrust bearing race 28. To obtain fine adjustment of the clutch disc pack containing elements 15—15a—15b—17 and 17a, lock screw 24 is unscrewed to back out projecting end thereby unlocking end plate 23. End plate 23 is rotated to a new position and being in threaded engagement with clutch body 20, adjustment of the spacing of the clutch disc pack is readily obtained. Stationary field 29 has an inner bearing 30 of a non-magnetic material that is held stationarily in engagement with stationary field 29 by virtue of a press fit. Inner bearing 30 is free to rotate on brake control sleeve 31 and is positioned axially by thrust bearing race 28. Brake control sleeve 31 is slideably mounted and rotates with clutch body 20. Brake control sleeve 31 has three projecting lugs 32 that project through milled slots in clutch body 20 and perform the function of exerting or releasing forces on brake body 33. Thrust plate 34, inner discs 17b and 17c and lock plate 18a have driving lugs in engagement with brake body 33. Stationary braking cup 35 is in positive engagement with lugs on outer discs 15c—15d and 15e. Stationary braking cup 35 also has an engaging slot 36 for accepting the head of a non-magnetic cap screw 37. Cap screw 37 is threaded into stationary field 29 and performs the function of preventing the rotation of stationary field 29. Stationary brake cup 35 is attached to housing 39 by cap screw 40.

Thrust plate 34 has three equally spaced positioning pins 21a. These positioning pins 21a are held in position by return springs 22a. Return springs 22a are mounted between thrust plate 34 and lock plate 18a, and function to impose a thrust force between thrust plate 34 and lock plate 18a to separate elements of the brake disc pack in its unlocked position. End plate 23a is in threaded engagement with brake body 33 and at assembly is locked in position by two or more screws 24a. Lock screw 24a has a projection end to interengage holes in lock plate 18a. To obtain fine adjustment of the brake disc pack containing element 15c—15d—15e—17b and 17c, lock screw 24a is unscrewed to back out projecting end thereby unlocking end plate 23a. End plate 23a is rotated to a new position and being in threaded engagement with brake body 33, adjustment of the brake disc pack is readily obtained. Brake body 33 is positively keyed to thrust body 41 by key 42. Compression spring 43 is mounted on thrust body 41 and held in position by adjustable nuts 44 and 44a. Lock nuts 44 and 44a are in threaded engagement with thrust body 41 and are used to adjust pressure on compression spring 43. Driven shaft 13 has at its outer end a nut 46 and a lock washer 45. Drive cup 12 is positioned in housing 39 by anti-friction bearing 48.

Although the foregoing description is necessarily of a detailed character, in order to completely set forth the invention it is to be understood that the specific terminology is not restrictive or confining and it is to be further understood that various rearrangement of parts and modification of structural detail, or reversal of elements may be resorted to without departing from the scope or spirit of the invention as herein described and claimed.

What is claimed is:

1. A clutch and brake apparatus comprising in combination a stationary housing, a driven shaft journalled in said housing, a driving cup journalled on said driven shaft, a thrust body mounted on said driven shaft, a brake body mounted on said thrust body and keyed thereto, a clutch body journalled on said brake body, a clutch disc pack and a brake disc pack mounted on said clutch body and said brake body, respectively, within said driving cup, a stationary braking cup mounted in said stationary housing in fixed relation thereto and in circumjacent relation to said brake body, a brake control means including a brake control sleeve mounted on said brake body and operatively connected to said brake disc pack for effecting engagement and disengagement of said brake disc pack, a compression spring mounted on said brake body and operatively connected to said brake disc pack for effecting engagement of said brake disc pack, power operating means including an actuator cam mounted on said brake body within said driving cup, said actuator cam being coaxial with said clutch disc pack and mounted for limited rotation therewith, a disc cam mounted on said brake body within said driving cup, said disc cam being adjacent to said actuator cam, coaxial with said clutch disc pack and mounted for rotation therewith, said actuator cam and said disc cam each having a face portion and said face portions being in confronting relation to each other, each of said face portions having a plurality of semi-circular shaped recesses therein, that are alined with each other and have spaces there between to provide pairs of oppositely positioned recesses, a plurality of balls mounted in the spaces between said pairs of recesses and being supported by said actuator cam and said disc cam, electromagnetic means including an annular electromagnet mounted on said brake control sleeve coaxial therewith and for rotation therewith and an armature disc mounted in said driving cup coaxial with and loosely positioned between the confronting face portions of said actuator cam and said disc cam and being slidably connected to said driving cup for rotation therewith, said electromagnetic means being operatively associated with said plurality of balls for axially moving said actuator cam and said armature disc to effect axial movement of said brake control sleeve for disengaging said brake disc pack from said driving cup and for engaging said clutch disc body with said clutch disc pack and said driving cup.

2. A clutch and brake apparatus, comprising in combination a stationary housing, a driven shaft coaxial with and rotatably mounted in said stationary housing, a rotatable cup coaxial with and rotatably mounted on said driven shaft adjacent one end of said stationary housing, a stationary braking cup mounted in said stationary housing adjacent the opposite end thereof in fixed relation thereto and in circumjacent relation to said driven shaft, a thrust body mounted on said driven shaft for rotating therewith, a brake body mounted on said thrust body in axial sliding relation therewith, a brake disc pack mounted on said brake body and operatively connected to said brake body and said stationary braking cup, a compression spring mounted on said brake body and operatively connected thereto for effecting engagement of said brake disc pack, a clutch body mounted on said thrust body for rotation therewith, a clutch disc pack mounted on said clutch body for operative connection to said clutch body and said driving cup, a brake control sleeve mounted on said brake body for axial slidable rotation with said clutch body, said brake control sleeve being operatively connected to said brake body for effecting engagement and disengagement of said brake disc pack, an actuator cam mounted on said brake body within said driving cup for coaxial and limited rotation with said clutch body, a disc cam mounted on said brake body within said driving cup for coaxial slidable rotation with said clutch body, said disc cam and said actuator cam each having a face portion and said face portions being in confronting relation to each other, each of said face portions having a plurality of semi-circular shaped recesses therein that are alined with each other and have spaces therebetween to provide pairs of oppositely positioned recesses, a plurality of balls mounted in the spaces between said pairs of recesses and being supported by said disc cam and said actuator cam, an armature disc mounted in said driving cup and loosely positioned between the face portions of said actuator cam and said disc cam, said armature disc being slidably connected to said driving cup for rotation therewith, electromagnetic means mounted on said brake control sleeve and operatively associated with said plurality of balls for moving said actuator cam into engagement with said armature disc to move said brake control sleeve to simultaneously effect disengagement of said brake disc pack and engagement of said clutch disc pack, said electromagnetic means comprising an annular electromagnet mounted on said brake control sleeve for coaxial free rotation therewith and for non-rotative axial sliding movement in said stationary housing.

3. In an electromagnetically actuated mechanical clutch and brake assembly in which a clutch and brake can be selectively engaged or disengaged, a stationary housing, a driven shaft coaxial with and rotatably mounted in said stationary housing, a driving cup coaxial with and mounted on said driven shaft, a stationary braking cup mounted in said stationary housing in fixed relation thereto in circumjacent relation to said driven shaft, a thrust body mounted on said driven shaft in coaxial relation thereto, a brake body mounted on said thrust body in coaxial and axial slidable relation with said thrust body and said brake body having a brake disc pack mounted thereon in fixed relation thereto, a compression spring loosely mounted on said thrust body and rotatably connected to said brake body for applying pressure to said brake disc pack, a clutch body mounted on said thrust body in coaxial relation therewith, said clutch body having a clutch disc pack mounted thereon in fixed relation thereto, a brake control sleeve mounted on said brake body in coaxial sliding relation to said clutch body and being adapted for alternate axial movement to effect engagement and disengagement of said brake disc pack, an actuating cam mounted on said brake body for free coaxial rotation with said brake body, a disc cam mounted on said brake body for axially slidable rotation with said clutch body, each of said actuator cam and said disc cam having a face portion thereon with said face portions being in parallel confronting relation to each other, each of said face portions having a plurality of semi-circular shaped recesses therein that are in substantial alinement with each other and have spaces there between, three balls located respectively in the spaces between the recesses of said actuator cam and said disc cam, an armature disc mounted in said driving cup and loosely positioned between the parallel faces of said actuator cam and said disc cam, said armature disc having driving lugs thereon for engagement with said driving cup so that said armature disc is rotatable with said driving cup, electromagnetic means operatively associated with said three balls for moving said actuator into engagement with said armature disc to move said brake control sleeve to simultaneously effect disengagement of said brake disc pack and engagement of said clutch disc pack with said driving cup in full couple, said electromagnetic means comprising an annular electromagnet mounted on said brake control sleeve for coaxial free rotation therewith and for non-rotative axial sliding movement in said stationary housing.

References Cited in the file of this patent

UNITED STATES PATENTS

| | | |
|---|---|---|
| 2,649,941 | Doebeli | Aug. 25, 1953 |
| 2,658,593 | Doebeli | Nov. 10, 1953 |
| 2,801,719 | Clerk | Aug. 6, 1957 |